(12) United States Patent
Robitaille et al.

(10) Patent No.: US 9,699,033 B2
(45) Date of Patent: *Jul. 4, 2017

(54) TRANSPARENT AUTO-NEGOTIATION OF ETHERNET

(71) Applicant: Accedian Networks Inc., Saint-Laurent (CA)

(72) Inventors: Claude Robitaille, St-Placide (CA); Steve Rochon, Brossard (CA)

(73) Assignee: Accedian Networks Inc., Saint-Lauent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/287,182

(22) Filed: Oct. 6, 2016

(65) Prior Publication Data
US 2017/0026241 A1 Jan. 26, 2017

Related U.S. Application Data

(63) Continuation of application No. 14/698,407, filed on Apr. 28, 2015, now Pat. No. 9,491,053, which is a
(Continued)

(51) Int. Cl.
*H04L 12/24* (2006.01)
*H04L 5/14* (2006.01)
(Continued)

(52) U.S. Cl.
CPC ........ *H04L 41/0886* (2013.01); *H04L 5/1438* (2013.01); *H04L 12/462* (2013.01); *H04L 41/0853* (2013.01); *H04L 49/3054* (2013.01)

(58) Field of Classification Search
None
See application file for complete search history.

(56) References Cited

U.S. PATENT DOCUMENTS 6,166,688 A 12/2000 Cromer
6,367,037 B1 4/2002 Remer
(Continued)

FOREIGN PATENT DOCUMENTS

CN 103685452 3/2014
EP 2421200 2/2012
(Continued)

OTHER PUBLICATIONS

Thomas, G. "Incorporating Media Converters." Contemporary Control Systems, Inc. the Extension. vol. 7, No. 6, Nov. 2006.*
(Continued)

*Primary Examiner* — Chirag Shah
*Assistant Examiner* — Jenkey Van
(74) *Attorney, Agent, or Firm* — Nixon Peabody LLP

(57) ABSTRACT

A system for negotiating Ethernet link settings between interconnected nodes in a network having an Ethernet protocol stack that includes a PCS sub-layer with an auto-negotiation function. The system comprises connecting an intermediate device coupled between two network nodes via optical or copper interfaces, with the link settings between each node and the connected intermediate device being the same, thereby bypassing the auto-negotiation of the PCS sub-layer in the intermediate device. The intermediate device may transparently send negotiation messages from each node to the other during the link negotiation phase without interacting with those messages. Instead of the intermediate device, a single form pluggable (SFP) device may be connected between the two network nodes via optical or copper interfaces on the network side and via an SFP slot on the device side.

16 Claims, 10 Drawing Sheets

Related U.S. Application Data continuation of application No. 13/608,476, filed on Sep. 10, 2012, now abandoned.

(51) Int. Cl.
  *H04L 12/46* (2006.01)
  *H04L 12/935* (2013.01)

(56) References Cited

U.S. PATENT DOCUMENTS

| | | | |
|---|---|---|---|
| 6,865,602 | B1 | 3/2005 | Nijemcevic |
| 6,987,743 | B2 | 1/2006 | Chen |
| 7,039,688 | B2 | 5/2006 | Matsuda |
| 7,225,243 | B1 | 5/2007 | Wilson |
| 7,242,693 | B1* | 7/2007 | Acharya ........... H04L 12/40136 370/445 |
| 7,317,926 | B1 | 1/2008 | Cloutier |
| 7,570,657 | B1 | 8/2009 | Lo |
| 7,778,162 | B2 | 8/2010 | Yu |
| 7,787,455 | B2 | 8/2010 | Cherchall |
| 7,912,075 | B1 | 3/2011 | Holland |
| 8,023,465 | B2 | 9/2011 | Prehofer |
| 8,098,671 | B1 | 1/2012 | Deruijter |
| 8,233,437 | B2 | 7/2012 | Tazaki |
| 8,509,072 | B2 | 8/2013 | Lee |
| 8,571,029 | B1 | 10/2013 | Aggarwal |
| 2002/0077117 | A1 | 6/2002 | Cloutier |
| 2002/0112004 | A1 | 8/2002 | Reid |
| 2003/0053421 | A1 | 3/2003 | Yoshimura |
| 2003/0056008 | A1 | 3/2003 | Russell |
| 2003/0225864 | A1 | 12/2003 | Gardiner |
| 2003/0229809 | A1 | 12/2003 | Wexler |
| 2004/0247313 | A1* | 12/2004 | Tanaka ............... H04L 12/4625 398/25 |
| 2004/0249906 | A1 | 12/2004 | Olbricht |
| 2005/0198260 | A1* | 9/2005 | Shahdadpuri ........... H04L 69/24 709/224 |
| 2005/0281256 | A1 | 12/2005 | Taipale |
| 2006/0274671 | A1 | 12/2006 | Budampati |
| 2007/0019598 | A1 | 1/2007 | Prehofer |
| 2007/0153091 | A1 | 7/2007 | Watlington |
| 2008/0077425 | A1 | 3/2008 | Johnson |
| 2008/0140815 | A1 | 6/2008 | Brant |
| 2008/0153477 | A1 | 6/2008 | Cloutier |
| 2009/0085806 | A1 | 4/2009 | Piersol |
| 2009/0251867 | A1 | 10/2009 | Sharma |
| 2010/0054154 | A1 | 3/2010 | Lambert |
| 2010/0080248 | A1* | 4/2010 | Aweya ................. H04J 3/0697 370/503 |
| 2010/0274917 | A1 | 10/2010 | Cherchali |
| 2010/0280858 | A1 | 11/2010 | Bugenhagen |
| 2011/0154072 | A1 | 6/2011 | Ho |
| 2011/0249408 | A1 | 10/2011 | Lavoie |
| 2011/0283140 | A1 | 11/2011 | Stevens |
| 2011/0305150 | A1 | 12/2011 | Haver |
| 2012/0014383 | A1 | 1/2012 | Geromel |
| 2012/0102239 | A1* | 4/2012 | Huang ............. H04L 12/40169 710/14 |
| 2012/0105877 | A1 | 5/2012 | Wakamatsu |
| 2012/0230186 | A1 | 9/2012 | Lee |
| 2012/0257558 | A1 | 10/2012 | Shin |
| 2012/0320751 | A1 | 12/2012 | Zhu |
| 2012/0327768 | A1 | 12/2012 | Sarwar |
| 2013/0077968 | A1 | 3/2013 | Yang |
| 2013/0346591 | A1 | 12/2013 | Carroll |
| 2014/0022936 | A1 | 1/2014 | Robitaille |
| 2014/0024255 | A1 | 1/2014 | Robitaille |
| 2014/0025790 | A1 | 1/2014 | Robitaille |
| 2014/0071855 | A1 | 3/2014 | Robitaille |

FOREIGN PATENT DOCUMENTS

| | | |
|---|---|---|
| KR | 20090004239 | 1/2009 |
| WO | WO 2010/097514 | 9/2010 |
| WO | WO 2011/054006 | 5/2011 |
| WO | WO 2014/013317 | 1/2014 |
| WO | WO 2014/013318 | 1/2014 |
| WO | WO 2014/013320 | 1/2014 |

OTHER PUBLICATIONS

Cyclone IV Device Handbook, vol. 1, Altera, Dec. 2010 (478 pages).
IEEE Standard for Information Technology, Part 3: Carrier Sense Multiple Access with Collision Detection (CSMA/CD) access method and Physical Layer specifications, 2008 (315 pages).
Gigabit Ethernet Auto-Negotiation, by Rich Hernandez, www.dell.com/powersolutions, 1999 (6 pages).
Cheshire, et al. "Dynamic Configuration of IPv4 Link-Local Addresses," May 2005, 33 pages.
Drimer and Kuhn, "A Protocol for Secure Remote Updates of FPGA Configurations", pp. 50-61, 2009, Lecture Notes in Computer Science vol. 5453, 12 pages.
Rad Data Communications, Rad & Miniature & SFP-S & SFF 8439 Specifications, Dec. 2007, 48 pages.
Rad Data Communications, Data Sheet—MIRICI-155 Intelligent Miniature GbE over STM-1/OC-3 NTU, 2007-2010, 4 pages.
Plummer, "An Ethernet Address Resolution Protocol—or—Converting Network Protocol Addresses to 48.bit Ethernet Address for Transmission on Ethernet Hardware," Nov. 1982, 10 pages.
Malkin, "Traceroute Using an IP Option," Jan. 1993, 7 pages.
https://lkml.org/lkml/2005/10/19/46 on Oct. 16, 2012, Ingo Molnar, Oct. 19, 2005, 7 pages.
Sosnoski, "Classworking toolkit: Combining source and bytecode generation," Oct. 4, 2005, 9 pages.
Thomas, G. "Incorporating Media Converters." Contemporary Control Systems, Inc. the Extension. vol. 7, No. 6, Nov. 2006 [online] [retrieved on Dec. 4, 2013]. Retrieved from the Internet: <URL: http://www.ccontrols.com/pdf/Extv7n6.pdf> (4 pages).
Avago Technologies. "1000BASE-T Interface and Functionality of ABCU-57xxRZ Gigabit Ethernet Small Form Puggable Electrical Transceivers Over Category 5 Unshielded Twisted Pair Cable—Application Note 5286." XP055091424, Sep. 14, 2010 [online] [retrieved on Dec. 4, 2013]. Retrieved from the Internet <URL: http://www.avagotech.com/docs/AV02-2643EN‎> (16 pages).
International Search Report and Written Opinion mailed Nov. 26, 2013 which issued in International Patent Application No. PCT/IB2013/001559 (8 pages).
International Search Report and Written Opinion mailed Dec. 4, 2013 which issued in International Patent Application No. PCT/IB2013/001557 (9 pages).
International Search Report and Written Opinion mailed Dec. 9, 2013 which issued in International Patent Application No. PCT/IB2013/001556 (7 pages).
Extended European Search Report mailed Dec. 18, 2013 which issued in European Patent Application No. 13183360.0 (11 pages).
Thomas, "Incorporating Media Converters," Contemporary Control Systems, Inc. the Extension. vol. 7, No. 6, Nov. 2006.

* cited by examiner

Figure 37-1—Location of the Auto-Negotiation function

TRANSPARENT AUTO-NEGOTIATION OF ETHERNET

This application is a continuation of U.S. patent application Ser. No. 14/698,407, filed Apr. 28, 2015, now allowed, which is a continuation of and claims priority to U.S. patent application Ser. No. 13/608,476, filed Sep. 10, 2012, now abandoned, each of which is hereby incorporated by reference herein in its entirety.

FIELD OF THE INVENTION

The present invention relates to the transparent negotiation of Ethernet settings between a pair of end devices connected to each other via an intermediate device, where the intermediate device does not participate in the negotiation phase between the two end devices, but inherits the Ethernet settings negotiated by the two end devices and initializes its Ethernet ports according to the results of the negotiation between the two end devices.

BACKGROUND OF THE INVENTION

When inserting a new device in a network, particularly when the new device is inserted between a pair of devices that would otherwise be directly connected together over Ethernet, there is a risk that the new device may impact the results of a negotiation of the Ethernet settings between the original pair of devices.

For instance, a disparity in the negotiation of the settings could occur when only one device is up when the intermediate device is started. This could result in the negotiation of a half-duplex Ethernet connection on one port of the intermediate device while the other port of the intermediate device negotiates a full-duplex Ethernet connection with the other remote device.

Another problem to handle is when there is only a single device connected to the intermediate device at a given time. Under such a scenario, the device connected to the intermediate device shall be able to operate at the highest possible speed supported by that said device and not have to wait for a second device to be connected to the intermediate device before it can negotiate the settings of the Ethernet connection.

In a typical 1000BaseT Ethernet protocol stack, the Physical Coding Sub-layer (PCS —see FIG. 3 "37-1-Location of the Auto-Negotiation function" from the IEEE 802.3-2008 standard) is responsible for the negotiation of the Ethernet settings for a specific Ethernet port on a device. The harmonization of the negotiation of the Ethernet settings for multiple ports in a single device is not covered by the IEEE 802.3-2008 standard.

There is a need to allow the ability to inspect and operate on Ethernet frames received over any of the ports of an intermediate device once the auto-negotiation phase is completed.

SUMMARY

In accordance with one embodiment, a system for negotiating Ethernet link settings between interconnected nodes in a network, the interconnected nodes having an Ethernet protocol stack that includes a PCS sub-layer with an auto-negotiation function comprises intermediate device coupled between two network nodes via optical or copper interfaces, with the link settings between each node and the connected intermediate device being the same, thereby bypassing the auto-negotiation function of the PCS sub-layer inside the intermediate device. The intermediate device may transparently send negotiation messages from each node to the other during the link negotiation phase without interacting with those messages.

In one implementation, a pair of network devices are attached to the intermediate device, and the intermediate device includes at least two physical ports and a management module that sets the two physical ports to Ethernet settings negotiated between the pair of network devices. Normal Ethernet functioning may be resumed after the negotiating of the link settings is complete.

This method allows the negotiation of the Ethernet settings between a pair of devices attached to the intermediate device to take place without the intermediate device taking part in the auto-negotiation phase between the pair of devices attached to the Ethernet ports of the intermediate device. This is achieved by bypassing (or modifying) the auto-negotiation sub-module in the PCS sub-layer where the configuration codes received on one of the Ethernet port of the intermediate device are directly sent to the PCS sub-layer transmit function on the other port of the intermediate device, bypassing the auto-negotiation sub-module defined by the IEEE 802.3-2008 standard for these Ethernet ports.

An additional management module is needed to monitor the negotiation exchange between the pair of devices attached to the intermediate device in order to set the two physical Ethernet ports of the intermediate device to the Ethernet settings negotiated between the pair of devices attached to the intermediate device. This is important since the intermediate device may have to process Ethernet frames exchanged between the pair of devices to perform Service OAM and other functions and the Ethernet settings of the two ports in the intermediate device need to exactly match the Ethernet configuration negotiated between the pair of devices connected to the intermediate device.

When there is only one device attached to the intermediate device, the negotiation shall proceed as per the IEEE 802.3-2008 standard as if the attached device was to negotiate with itself.

Finally, all other Ethernet frames need to flow through the MAC sub-layer of the individual Ethernet ports of the intermediate device (in receive and/or transmit mode).

In a modified embodiment, a method of negotiating Ethernet link settings between interconnected nodes in a network comprises connecting a single form pluggable (SFP) device between two network nodes via optical or copper interfaces on the network side and via an SFP slot on the device side, and negotiating the link settings identically between each node and the connected SFP device. The SFP device may transparently send negotiation messages from each node to the other during the link negotiation phase without interacting with those messages.

In one implementation, the SFP device includes two physical ports, and which includes a pair of network devices attached to said SFP device, and a management module that sets the two physical ports to Ethernet settings negotiated between the pair of network devices. Here again, normal Ethernet functioning may be resumed after a link negotiation sequence is complete

BRIEF DESCRIPTION OF THE DRAWINGS

The invention may best be understood by reference to the following description taken in conjunction with the accompanying drawings.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

The invention is aimed at allowing an intermediate device to facilitate the interconnection and the automatic negotiation of the Ethernet settings (e.g speed, half or full duplex, master or slave for clock or other parameters) between a pair of devices as if these devices were directly interconnected by a standard Ethernet cable. By inserting an intermediate device between the pair of devices, it is possible to offer Service OAM and other functions without disrupting the operation of the pair of devices. This transparent mode of operation of the intermediate device includes enabling a totally transparent negotiation of the Ethernet settings for each connection as if they were a simple Ethernet cable directly connecting the pair of devices.

Figure 1:
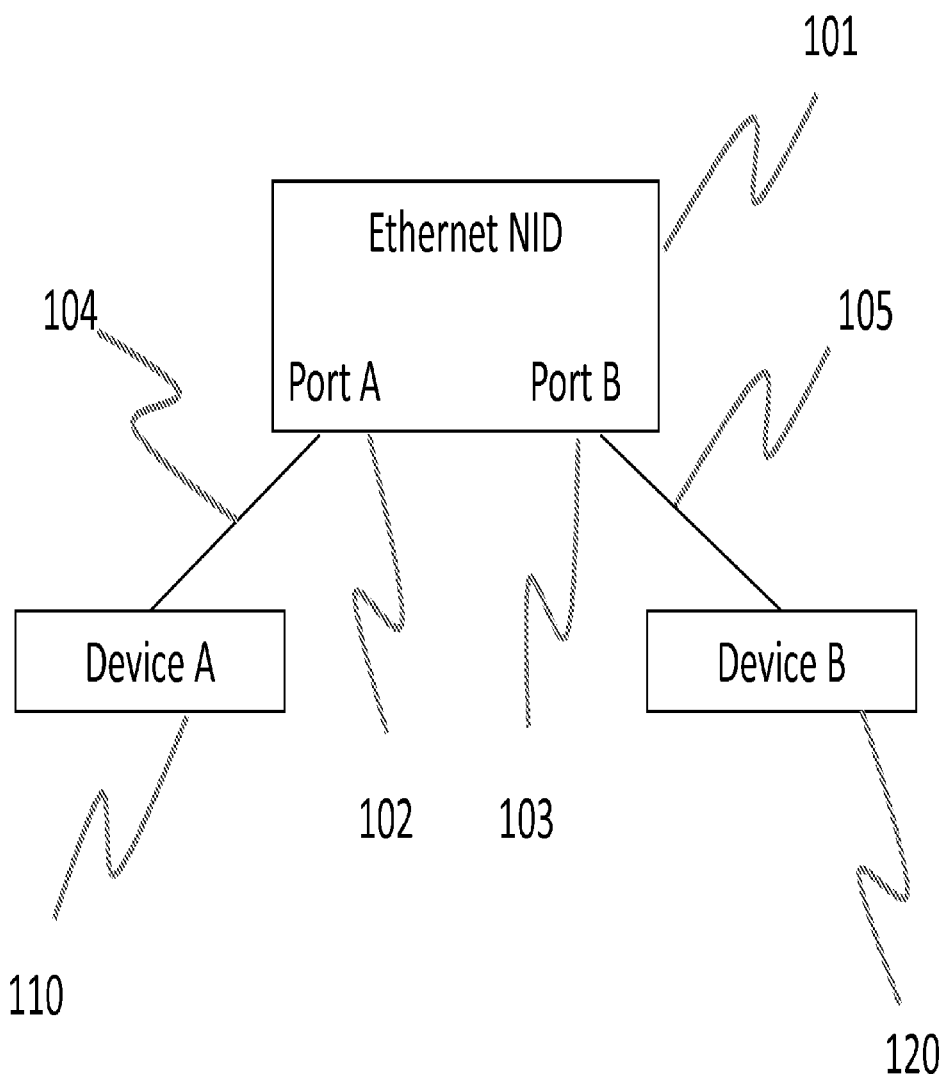
FIG. 1 is a simple network where two devices are connected with an intermediate device

An example of this can be seen in FIG. 1 where device A 110 and device B 120 are interconnected via Ethernet connections 104 and 105 to the intermediate device 101. More specifically, device A 110 is connected to the intermediate device 101 via Ethernet port 102 and device B 120 is connected to the intermediate device 101 via Ethernet port 103. As described further below, the negotiation of the Ethernet settings takes place transparently between the devices 110 and 120 as if they were connected directly via a single Ethernet cable.

Figure 2:
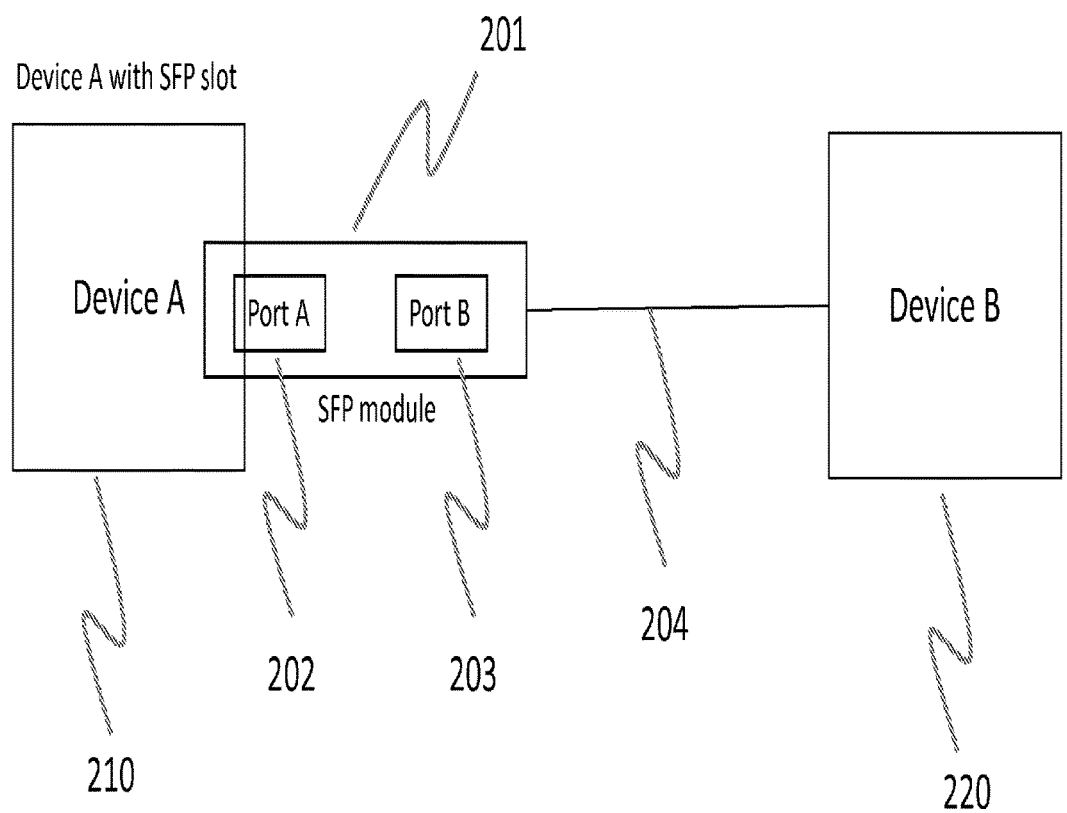
FIG. 2 is a simple network where two devices are connected with an intermediate SFP

FIG. 2 illustrates another embodiment of the invention where the intermediate device is embodied as a standard-based Single Form Pluggable (SFP) device with an embedded FPGA device and an optional CPU module (which can be internal or external to the FPGA module). Device A 210 is a network node with a standard-based SFP slot. An SFP module 201 is inserted in device A 210 and acts as a transparent intermediate device between device A 210 and device B 220. The SFP module 201 incorporates a pair of Ethernet ports. The Ethernet port 202 interfaces to device A 210 in compliance with the physical connector and signaling defined by the SFP standard. Ethernet port 203 uses a standard Ethernet connector (such as an RJ-45 or an optical connector) to connect to device B 220 over either a copper or optical fibre 204. The functions and services offered by the SFP module 201 are analogous to the intermediate device 101 described in FIG. 1.

The negotiation techniques described below apply to both of these embodiments and any alternative embodiment using an intermediate device known to someone skilled in the art unless explicitly stated otherwise.

Figure 3:
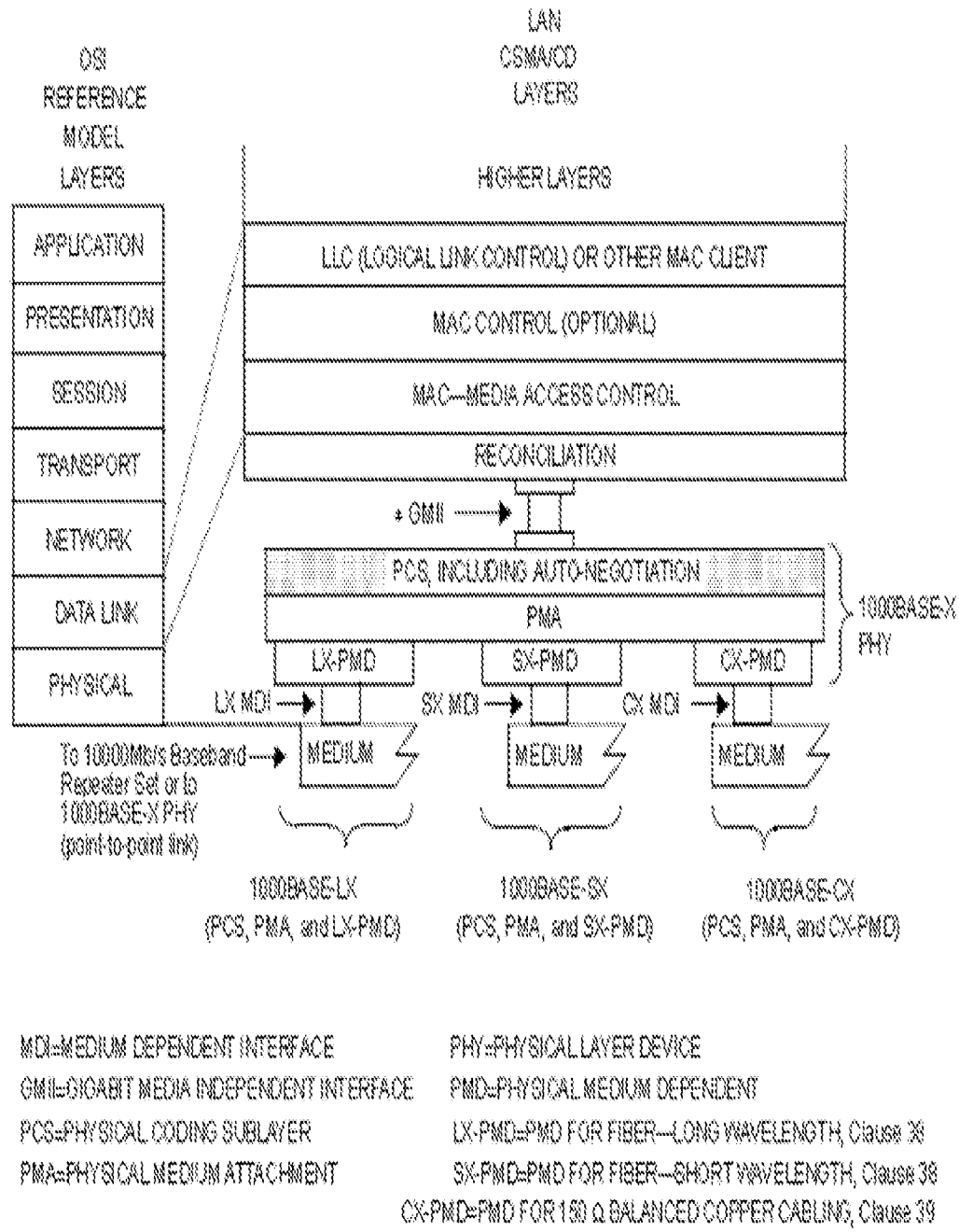
FIG. 3 illustrates the sub-layers corresponding to the Data Link layer as defined in the generic OSI model.

The IEEE 802.3-2008 standard defines the operation of the Ethernet protocol stack at various operating speeds, including Gigabit Ethernet (also referred to as 1000BaseT Ethernet). FIG. 3 is extracted and corresponds to FIG. 37-1 from the IEEE 802.3-2008 standard and illustrates the sub-layers corresponding to the Data Link layer as defined in the generic OSI model. In a typical 1000BaseT Ethernet protocol stack, the Physical Coding Sub-layer (PCS) is responsible for various functions, including the Auto-Negotiation function of the Ethernet settings for the Ethernet connection carried over a specific Ethernet port. The Auto-negotiation function of the PCS sub-layer is defined in the standard to cover the operation of a single Ethernet port at a time. As such, the IEEE 802.3-2008 standard does not define how to handle the harmonization of the negotiation of the Ethernet settings for multiple ports in a single device.

Figure 4:
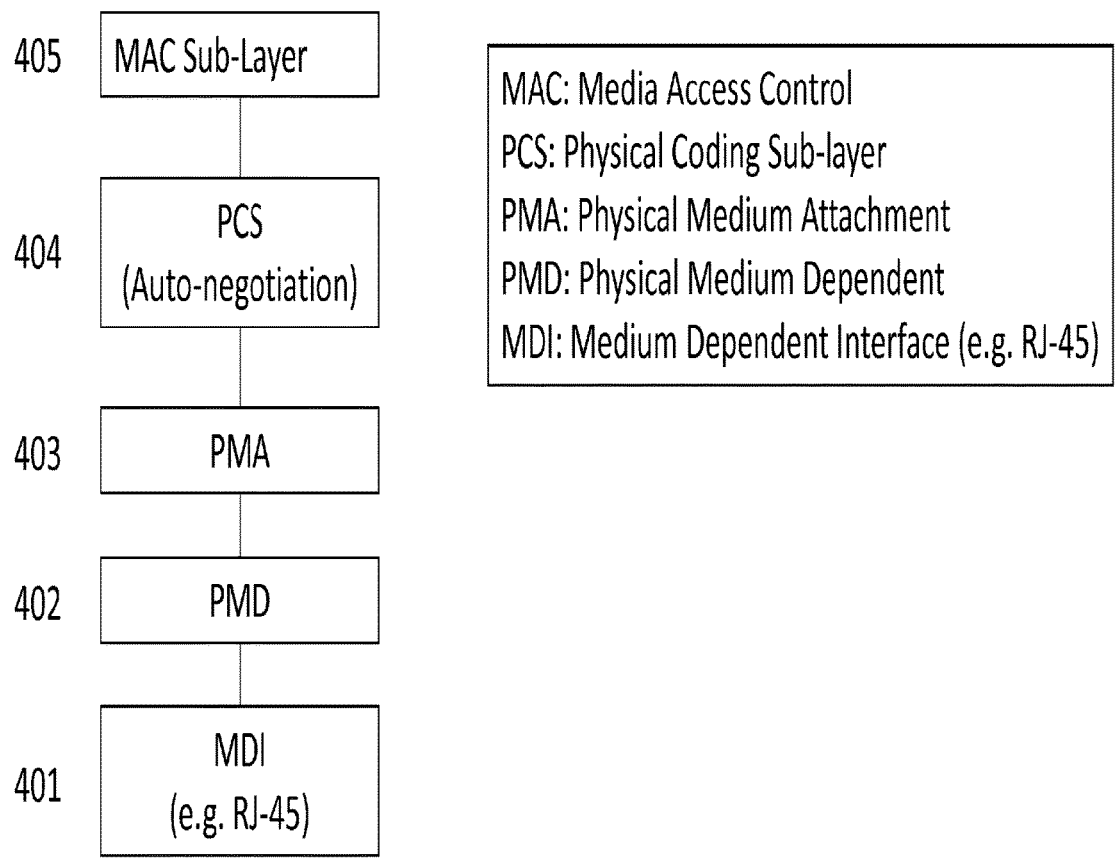
FIG. 4 illustrates the protocol sub-layers of the Ethernet Data Link protocol

The Ethernet Data Link protocol layer is made up of several protocol sub-layers. As seen in FIG. 4, the Medium Independent Interface (MDI) 401 is responsible for the physical interconnection to the Ethernet cable. Frequently, this is achieved via the popular RJ-45 interface, although optical and other medium may also be used. The Physical Medium Dependent (PMD) sub-layer 402 is responsible for presenting a medium independent interface to the Physical Medium Attachment (PMA) sub-layer 403. The PMA sub-layer interfaces with the Physical Coding Sub-layer (PCS) 404 that is responsible, amongst other things, for the auto-negotiation settings of the Ethernet connection over the Ethernet port. When operating at 1000BaseT speeds, the auto-negotiation phase is a mandatory feature as specified by the IEEE 802.3-2008 standard. While negotiation codes are handled inside the PCS sub-layer 404, all other Ethernet frames are passed to (or received from) the Media Access Control (MAC) sub-layer 405. When looking at each sub-layer of the Ethernet protocol stack in FIG. 4, as is known in the art and as per the definition of the Ethernet standard, it should be noted that each sub-layer further includes a Receive and a Transmit function.

Figure 5:
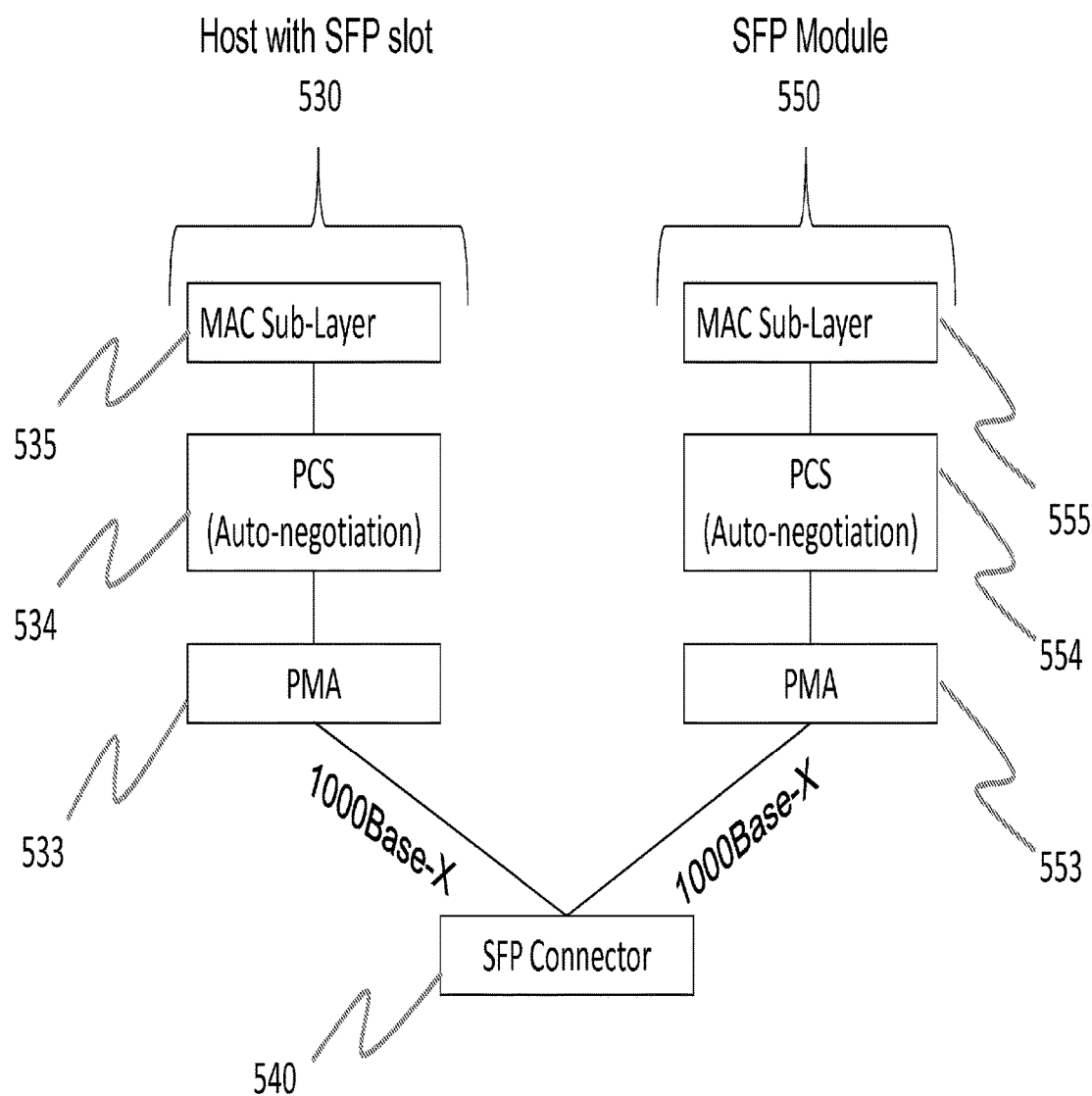
FIG. 5 illustrates how one of the Ethernet port of the intermediate device interfaces with the host with the SFP slot rather than with a physical Ethernet port (copper or optical)

FIG. 5 illustrates how one of the Ethernet ports of the intermediate device interfaces with the host with the SFP slot rather than with a physical Ethernet port (copper or optical) when an SFP module is inserted in an SFP slot of a host device. The SFP module 550 interfaces to the Host device 530 via its SFP connector 540. The Ethernet sub-layers on the SFP module 550 are limited to a subset of the layers illustrated by FIG. 4 above. The MAC sub-layer 555 interfaces in a traditional way to the PCS sub-layer 554 that in turn interfaces to the PMA sub-layer 553. The lower interface of the PMA sub-layer 553 uses the 1000Base-X encoding to communicate over the SFP connector 540. The Ethernet sub-layers on the Host device 530 are similar. The MAC sub-layer 535 interfaces in a traditional way to the PCS sub-layer 534 that in turn interfaces to the PMA sub-layer 533. The lower interface of the PMA sub-layer 533 uses the 1000Base-X encoding to communicate over the SFP connector 540.

The negotiation of the Ethernet settings between a pair of devices attached to an intermediate device can take place without involving the auto-negotiation function usually performed at the PCS sub-layer in the Ethernet protocol stack for each port of the intermediate device connected to the pair of external devices 110 and 120 in FIG. 1.

Figure 6:
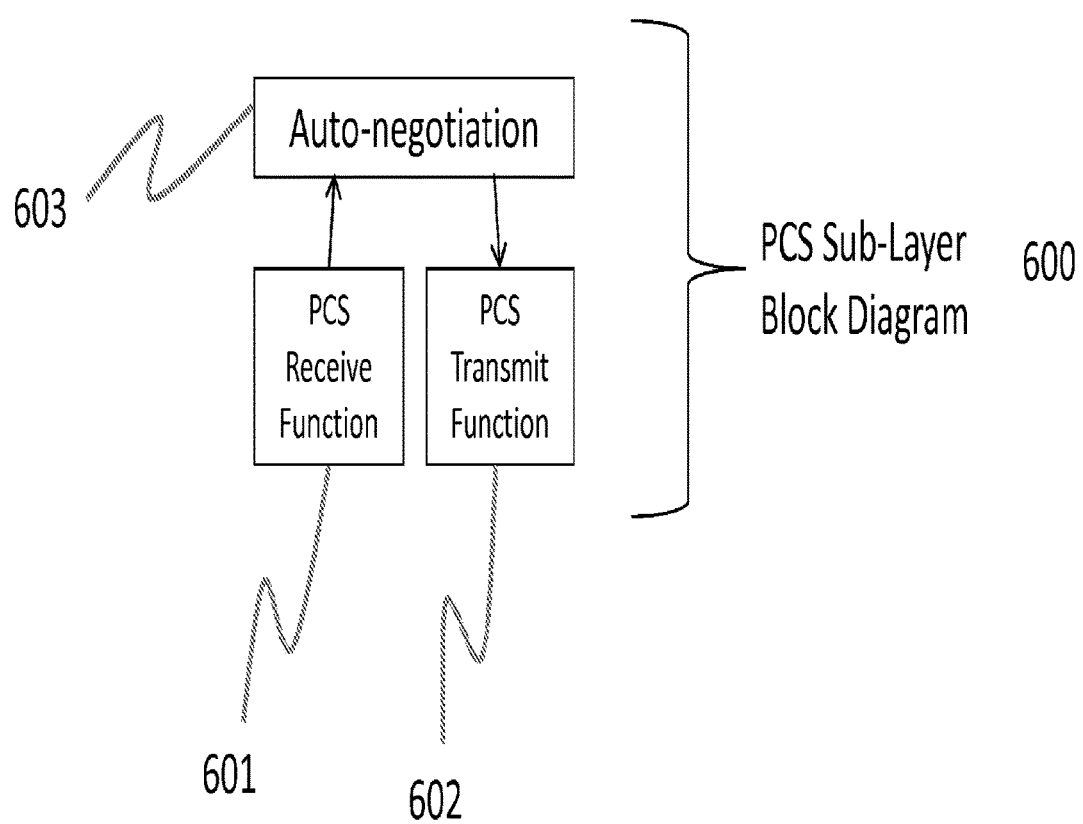
FIG. 6 illustrates how the PCS sub-layer is broken into distinct functional modules.

FIG. 6 illustrates how the PCS sub-layer 600 is broken into distinct functional modules. The PCS Receive function 601 passes Ethernet negotiation codes received from the PMA sub-layer to the Auto-negotiation function 603. Incoming Ethernet data frames from the PMA sub-layer are passed directly to the MAC sub-layer (not shown in FIG. 6). The PCS Transmit function 602 passes Ethernet negotiations code from the Auto-negotiation function 603 to the PMA sub-layer for eventual transmission to the remote device with which it is negotiating the Ethernet settings. The PCS Transmit function 602 is also responsible for Ethernet data frames originating from the MAC layer (not shown in FIG. 6). The transparent auto-negotiation of the Ethernet settings is performed as if the PCS Auto-negotiation function 603 inside each of the pair of external devices (from the point of view of an intermediate device) were directly interconnected via an Ethernet cable. This is achieved by bypassing (or modifying) the Auto-negotiation function 603 in the PCS sub-layer 600 of each Ethernet port of the intermediate device where the configuration codes received on one of the Ethernet port are directly sent to the PCS sub-layer transmit function 602 of the Ethernet protocol stack of the other Ethernet port on the intermediate device, bypassing the Auto-negotiation function 603 defined by the IEEE 802.3-2008 standard.

Figure 7:
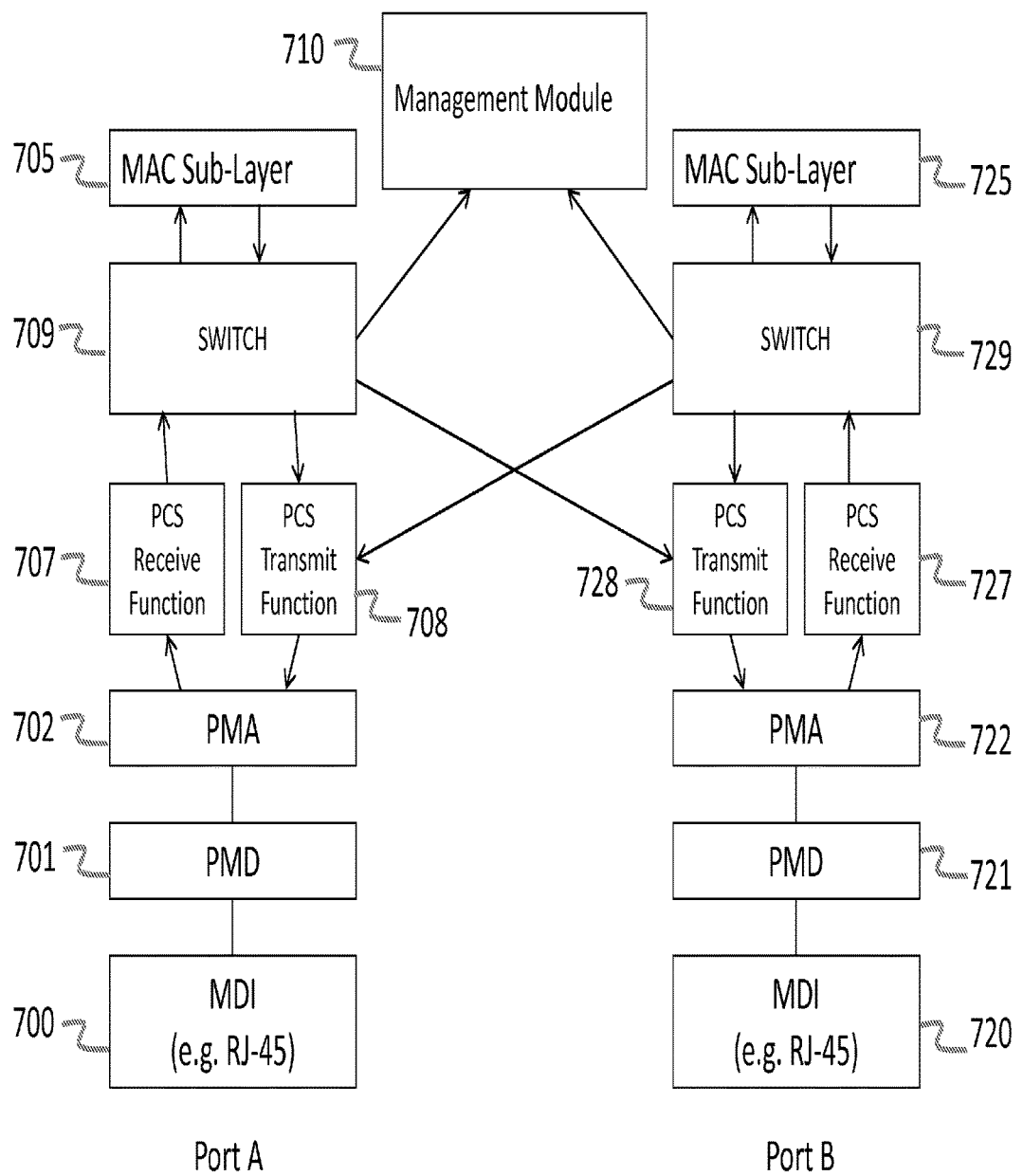
FIG. 7 illustrates how the Auto-negotiation function of the PCS sub-layer is replaced or modified to support this invention.

FIG. 7 illustrates an embodiment of the Auto-negotiation function of the PCS sub-layer. The full Ethernet protocol stack is shown for a pair of Ethernet ports (700, 720). The PMD sub-layer 701 and the PMA sub-layer 702 operate as per the IEEE 802.3-2008 standard. The PCS sub-layer is modified by replacing the Auto-negotiation function normally found in a standard implementation of the PCS sub-layer with a new function that acts as a programmable switch for the 8-bit interface provided by the PMA sub-layer. The switch function 709 will by default be set in the CONFIGURATION mode. Any received /C/ and /I/ ordered sets received over the PCS Receive function 707 will be passed to a switch 709, and the switch 709 will be configured by the Management module 710 to forward all ordered sets /C/ and /I/ received over the PCS Receive function 707 to the PCS Transmit function 728 of the other Ethernet port 720. The switch 709 will also forward the Ethernet ordered sets /C/ and /I/ to the Management module 710 responsible for determining when the auto-negotiation phase between the devices attached to port 700 and port 720 of the intermediate device is completed. The same behaviour takes place for the second Ethernet port. The switch 729 is configured by the Management module 710 to forward all /C/ and /I/ ordered sets received over the PCS Receive function 727 to the PCS Transmit function 708 of the other Ethernet port 700. The switch 729 will also forward the /C/ and /I/ ordered sets to the Management module 710 responsible for determining when the auto-negotiation phase between the devices attached to port 700 and port 720 of the intermediate device is completed. The Management module will analyze the ordered sets /C/ and /I/ it receives from switch 709 and from switch 729 to learn the Ethernet settings as the auto-negotiation phase progresses between the device attached to port 700 and the device attached to port 720. The Management module will determine that the auto-negotiation process is completed when it sees a /I/ ordered set from either of the devices attached to ports 700 and 720 over their respective PCS Receive functions 707 and 727.

Upon detecting that the auto-negotiation phase is completed, the management module 710 programs the switch 709 and the switch 729 in DATA mode to stop forwarding the /C/ and /I/ ordered sets to the PCS Transmit function (708 and 728) of the other Ethernet port (700, 720). Switch 709 will be programmed to send all /R/, /S/, /T/ and /V/ ordered sets to the MAC Sub-layer 705, and the Switch 729 will be programmed to send all /R/, /S/, /T/ and /V/ordered sets to the MAC Sub-layer 725. Both switch 709 and switch 729 will continue to forward all /I/ and /C/ ordered sets to the Management module 710 to detect whether one of the devices attached to port 700 or port 720 needs to re-enter in the auto-negotiation phase. When the Management module 710 detects that a new auto-negotiation phase needs to take place, it will program switch 709 and switch 729 to operate in the CONFIGURATION mode.

Once the auto-negotiation phase is completed, the Management Module 710 needs to set the parameters of the Ethernet ports of the intermediate device. Particular attention is needed when an Ethernet port of the intermediate device operates over copper. If the remote device attached to such an Ethernet port is assigned the role of Master (for the clocking), then the corresponding Ethernet port of the intermediate device shall be configured in Slave mode. Otherwise, if the remote device is assigned the role of Slave, then the corresponding Ethernet port of the intermediate device shall be configured in Master mode. If the pair of Ethernet ports (700, 720) of the intermediate device both operate over copper, one Ethernet port (in the pair of ports) will be configured as a Master, and the other Ethernet port (in the same pair of ports) will be configured as a Slave. The Management module 710 also needs to make sure both Ethernet ports (700, 720) are set to the negotiated duplex settings: Full or Half.

If the Ethernet ports of the intermediate device are made up of an optical Ethernet port and of a copper Ethernet port, the Management Module 710 will need to intercept all of the /C/ ordered sets to make sure that the Master/Slave mode and the Duplex settings negotiation only take place on the Ethernet over copper port. This can be achieved by programming the Switches 709 and 729 to pass all of the /C/ ordered sets to the Management module 710 instead of simply relaying the /C/ to the PCS transmit function 708 or 728 of the other Ethernet port.

When there is only one device attached to the intermediate device, the negotiation shall proceed as per the IEEE 802.3-2008 standard as if the attached device was to negotiate with itself. Looking again at FIG. 7 and assuming that the device is attached to port 700, the Switch 709 will initially be programmed by the Management module 710 in CONFIGURATION mode to forward the /C/ and /I/ ordered sets received over the PCS Receive function 707 to the PCS Transmit function 708 to loopback the /C/ and /I/ ordered sets back to the device on port 700. The Switch 709 will also be programmed to forward the /C/ and /I/ordered sets to the Management module 710 to allow it to determine the end of the auto-negotiation phase and to program the Switch 709 in DATA mode to stop forwarding to the PCS Transmit function 708 and instead forward the /R/, /S/, /T/ and /V/ ordered sets to the MAC sub-layer 705 and the Management module 710. Alternatively, if the single device is attached to port 720, the Management module 710 will program the Switch 729 in CONFIGURATION mode to forward the /C/ and /I/ ordered sets received over the PCS Receive function 727 to the PCS Transmit function 728 to loopback the /C/ and /I/ ordered sets back to the device on port 720. The Switch 729 will also be programmed to forward the /C/ and /I/ code sets to the Management module 710 to allow it to determine the end of the auto-negotiation phase and to program the Switch 729 in DATA mode to stop forwarding to the PCS Transmit function 728 and instead forward the /C/ and /I/ code sets to Management module 710.

The replacement of the Auto-negotiation function of the PCS sub-layer in FIG. 7 and described above may also be achieved by other embodiments.

Figure 8:
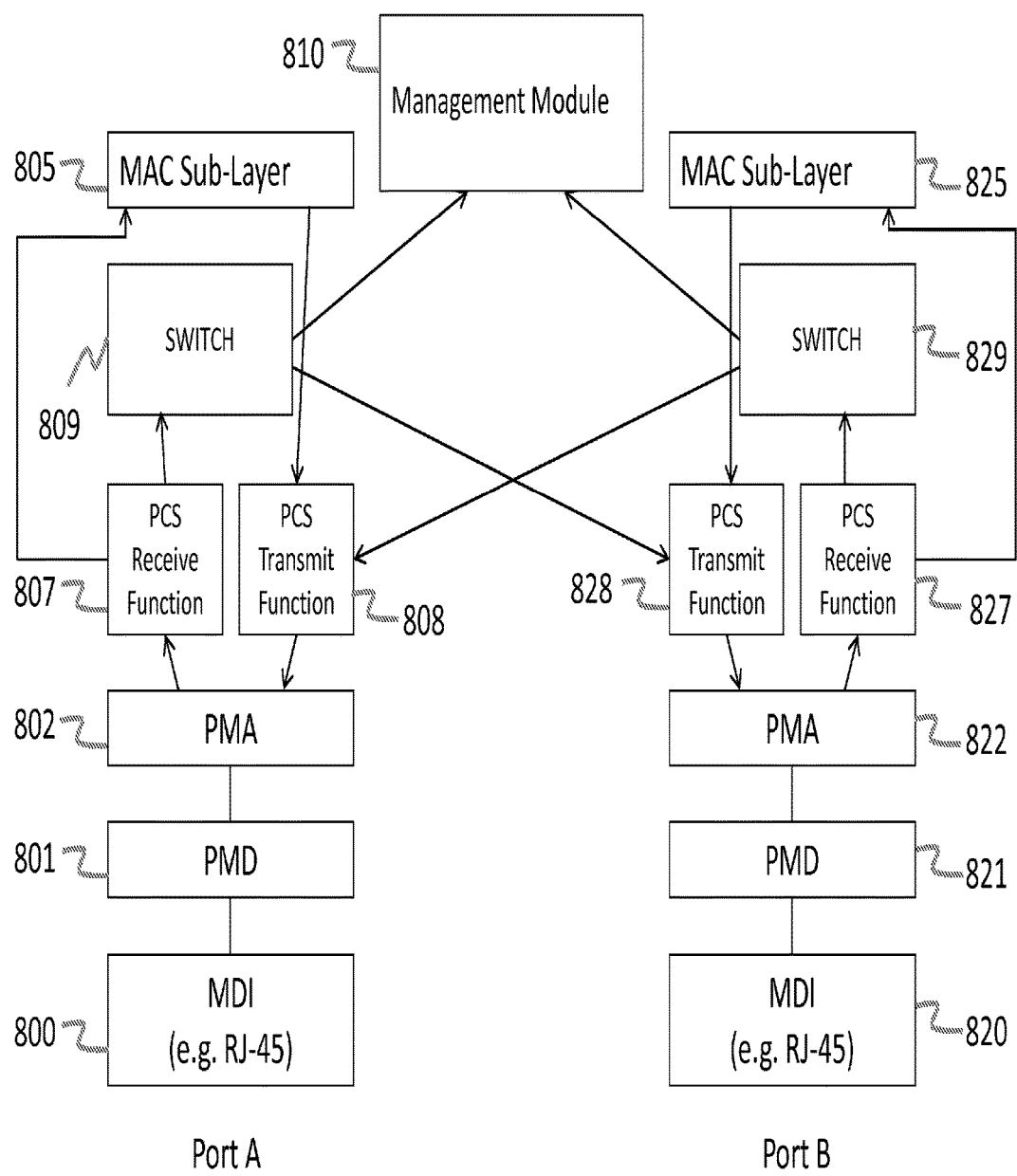
FIG. 8 illustrates an alternate implementation with changes to the interactions and functions of the Switch Modules, Management module and the interface with the PCS Transmit and Receive functions

In an alternate embodiment shown in FIG. 8, the interactions and functions of the Switch Modules 809 and 829 with the Management module 810 and the interface with the PCS Receive function 807 and 827 and with the PCS Transmit function 808 and 828 is different from FIG. 7. More specifically, the PCS Receive function 807 and 827 includes the ability to detect the type of Ethernet ordered sets and can forward the /R/, /S/, /T/ and /V/ data ordered sets directly to the MAC sub-layer 805 (for PCS Receive function 807) and 825 (for PCS Receive function 827). All other ordered sets /C/ and /I/ will be forwarded to the Switch function (809, 829) in order to be replicated on the other Ethernet port (800, 820) and will also be forwarded to the Management module 810 to keep track of the state of the auto-negotiation. PCS Receive function 807 will forward the /C/ and /I/ ordered sets to Switch 809 that will in turn forward the ordered sets to the Management module 810 and to the PCS Transmit function 828. PCS Receive function 827 will forward the /C/ and /I/ ordered sets to Switch 829 that will in turn forward the ordered sets to the Management module 810 and to the PCS Transmit function 808. The MAC sub-layer will use the PCS Transmit function directly for all /R/, /S/, /T/ and /V/ ordered sets. MAC sub-layer 805 will interface directly with PCS Transmit function 808, and MAC sub-layer 825 will interface directly with PCS Transmit function 828. The behavior or the other Ethernet sub-layers (PMA, PMD and MDI) remains the same as the description of FIG. 7.

Once the auto-negotiation phase is completed, the Management Module 810 needs to set the parameters of the Ethernet ports (800, 820) of the intermediate device as per FIG. 7.

If the Ethernet ports of the intermediate device are made up of an optical Ethernet port and of a copper Ethernet port, the Management Module 810 will need to intercept all of the /C/ ordered sets to make sure that the Master/Slave mode and the Duplex settings negotiation only take place on the Ethernet over copper port. This can be achieved by programming the Switches 809 and 829 to pass all of the /C/ ordered sets to the Management module 810 instead of simply relaying the /C/ to the PCS transmit function 808 or 828 of the other Ethernet port.

Figure 9:
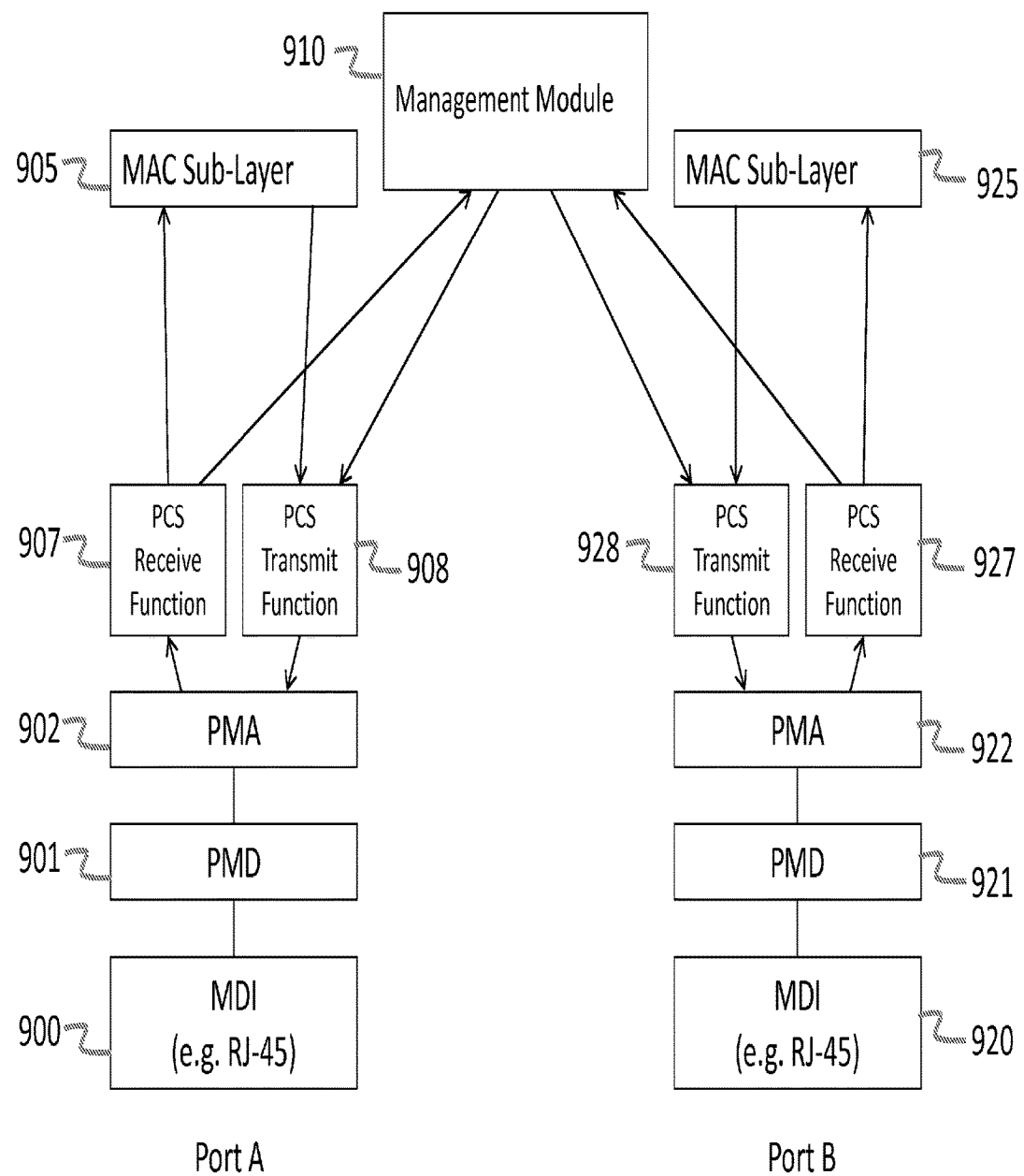
FIG. 9 illustrates an alternate implementation where the Switch Modules used previously are integrated as part of the Management module that interfaces directly with the PCS Receive function and with the PCS Transmit function.

In an alternate embodiment shown in FIG. 9, the Switch Modules used previously (see FIG. 7 and FIG. 8) are integrated as part of the Management module 910 that interfaces directly with the PCS Receive function 907 and 927 and with the PCS Transmit function 908 and 928. More specifically, the PCS Receive function 907 and 927 includes the ability to detect the type of Ethernet ordered sets and can forward the /R/, /S/, /T/ and /V/ data ordered sets directly to the MAC sub-layer 905 (for PCS Receive function 907) and 925 (for PCS Receive function 927). All other ordered sets /C/ and /I/ will be forwarded to the Management module 910 in order to be replicated on the other Ethernet port (900, 920) and to keep track of the state of the auto-negotiation. PCS Receive function 907 will forward the /C/ and /I/ ordered sets to management module 910 that will in turn forward the ordered sets to the PCS Transmit function 928. PCS Receive function 927 will forward the /C/ and /I/ ordered sets to Management module 910 that will in turn forward the ordered sets to the PCS Transmit function 908. The MAC sub-layer will use the PCS Transmit function directly for all /R/, /S/, /T/ and /V/ ordered sets. MAC sub-layer 905 will interface directly with PCS Transmit function 908, and MAC sub-layer 925 will interface directly with PCS Transmit function 928. The behavior or the other Ethernet sub-layers (PMA, PMD and MDI) remains the same as the description of FIG. 7.

Once the auto-negotiation phase is completed, the Management Module 910 needs to set the parameters of the Ethernet ports (900, 920) of the intermediate device as per FIG. 7.

Figure 10:
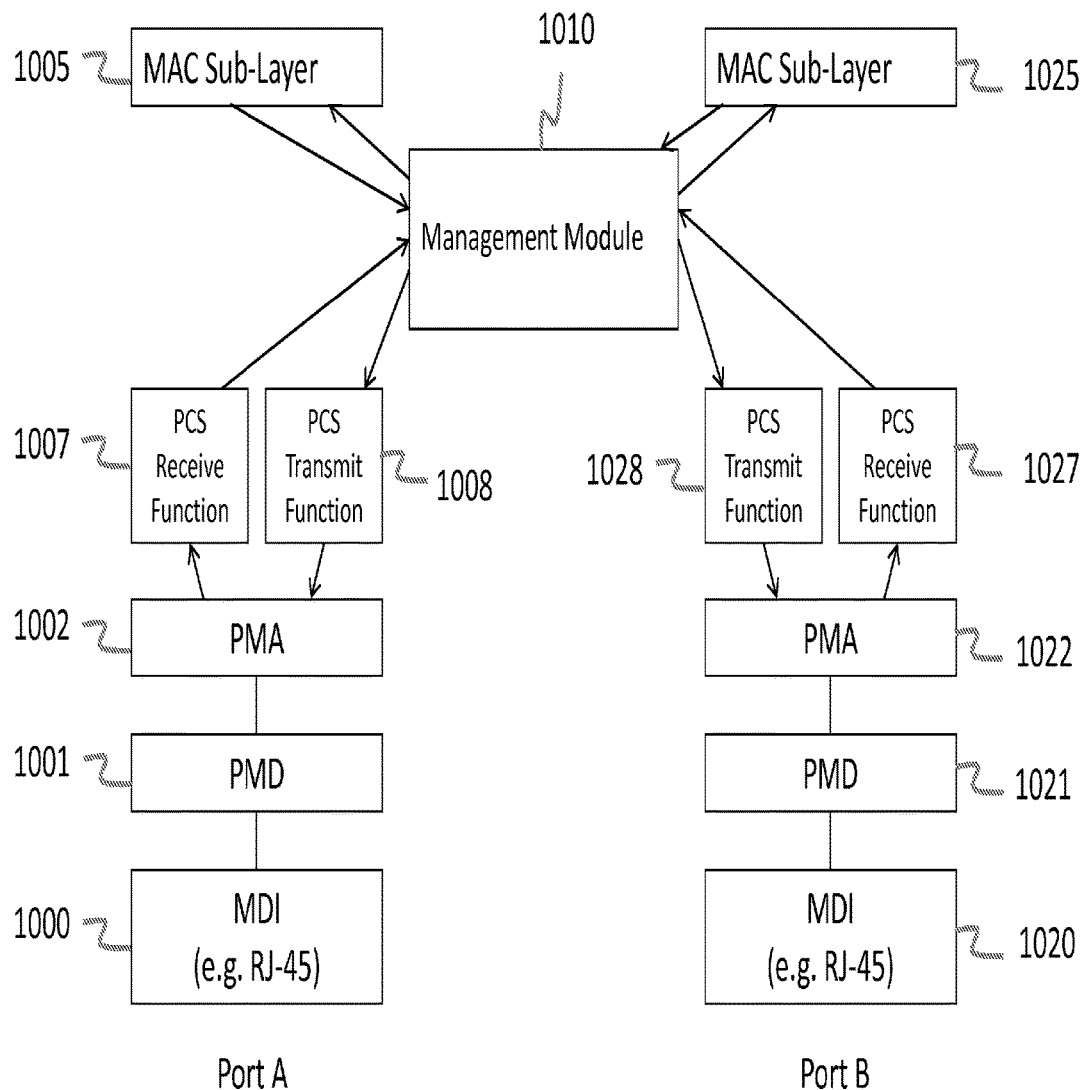
FIG. 10 illustrates an alternate implementation where the management module handles the interfacing between the MAC sub-layer and the PCS Receive and Transmit functions.

In a final alternate embodiment shown in FIG. 10, the Management module 1010 handles the interfacing between the MAC sub-layer and the PCS Receive and PCS Transmit functions. More specifically, the PCS Receive function 1007 and 1027 forward all Ethernet ordered sets to the Management module 1010 that will determine the type of ordered sets received. The Management module 1010 will relay /C/ and /I/ ordered sets to the other Ethernet port. /C/ and /I/ ordered sets received from PCS Receive function 1007 will be forwarded to PCS Transmit function 1028, and /C/ and /I/ ordered sets received from PCS Receive function 1027 will be forwarded to PCS Transmit function 1008. /R/, /S/, /T/ and /V/ordered sets received by the Management module 1010 from the PCS Receive function 1007 will be forwarded to the MAC sub-layer 1005, and /R/, /S/, /T/ and /V/ ordered sets received from the MAC sub-layer 1005 will be passed to the PCS Transmit function 1008. /R/, /S/, /T/ and /V/ordered sets received by the Management module 1010 from the PCS Receive function 1027 will be forwarded to the MAC sub-layer 1025 and /R/, /S/, /T/ and /V/ ordered sets received from the MAC sub-layer 1025 will be passed to the PCS Transmit function 1028. The behavior or the other Ethernet sub-layers (PMA, PMD and MDI) remains the same as the description of FIG. 7.

Once the auto-negotiation phase is completed, the Management Module 1010 needs to set the parameters of the Ethernet ports (1000, 1020) of the intermediate device as per FIG. 7.

The embodiments described above can be implemented inside a single FPGA device. Alternatively, they may be implemented between a plurality of FPGA devices and/or a general purpose CPU. It should be noted that the general purpose CPU may alternatively be implemented inside an FPGA device (for instance, a NIOS module in an ALTERA FPGA).

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A system for negotiating Ethernet settings in a network, the system comprising:

a first network device and a second network device, both comprising an Ethernet protocol stack comprising physical coding sub-layer with an auto-negotiation function;

an intermediate device connected to the first network device and the second network device, the intermediate device comprising:

a first network interface coupled to the first network device and a second network interface coupled to said second network device, said first network interface and said second network interface both comprising an Ethernet protocol stack comprising a physical coding sub-layer with a function that acts as a switch;

said switch coupled between said first network interface and said second network interface for communication of the intermediate device; and a management module, coupled to said switch, for:

receiving auto-configuration codes from said first network interface and said second network interface;

monitoring said auto-configuration codes to determine an auto-configuration status of said first network device and said second network device; and, upon detecting that said auto-configuration status is incomplete, programming said switch into a configuration mode; and, upon detecting that said auto-configuration status is complete, programming said switch into a data mode and configuring said protocol stack of the intermediate device to be compatible with said auto-configuration codes; wherein:

while said switch is in said configuration mode, said auto-configuration codes are received from said first network device to said second network device and said auto-configuration codes are received from said second network device to said first network device without modification of the received auto-configuration codes and bypassing an auto-negotiation function of the physical coding sub-layer of said intermediate device; and when said intermediate device couples while said switch is in said data mode, said first network interface and said second network interface couple with a media access control (MAC) layer of said Ethernet protocol stack of said intermediate device via said switch.

2. The system of claim 1, wherein said intermediate device is a small-form factor pluggable (SFP) transceiver.

3. The system of claim 2, wherein said SFP has one port connected in the first device and the other port connected to the network.

4. The system of claim 2, wherein the SFP transceiver is an optical transceiver.

5. The system of claim 1, wherein said first device and said second device are connected to said intermediate device via an interface selected from an optical interface, a copper interface, and a combination thereof.

6. The system of claim 1, wherein the Ethernet settings are selected from the group consisting of speed, half or full duplex, master clock, slave clock, and other parameters.

7. The system of claim 1, wherein the intermediate device comprises a field-programmable gate array (FPGA), central processing unit (CPU), or combination thereof.

8. A system for negotiating Ethernet settings in a network, the system comprising:

a first network device and a second network device, both comprising an Ethernet protocol stack comprising physical coding sub-layer with an auto-negotiation function;

an intermediate device connected to the first network device and the second network device, the intermediate device comprising:

a first network interface coupled to the first network device and a second network interface coupled to said second network device, said first network interface and said second network interface both comprising an Ethernet protocol stack comprising a physical coding sub-layer with a function that acts as a switch;

said switch coupled between said first network interface and said second network interface for communication of the intermediate device; and a management module, coupled to said switch, for:

receiving auto-configuration codes from said first network interface and said second network interface;

monitoring said auto-configuration codes to determine an auto-configuration status of said first network device and said second network device; and, upon detecting that said auto-configuration status is incomplete, programming said switch into a configuration mode; and, upon detecting that said auto-configuration status is complete, programming said switch into a data mode and configuring said protocol stack of the intermediate device to be compatible with said auto-configuration codes;

wherein:

while said switch is in said configuration mode, said auto-configuration codes are received from said first network device to said second network device and said auto-configuration codes are received from said second network device to said first network device without modification of the received auto-configuration codes and modifying an auto-negotiation function of the physical coding sub-layer of said intermediate device; and when said intermediate device couples while said switch is in said data mode, said first network interface and said second network interface couple with a media access control (MAC) layer of said Ethernet protocol stack of said intermediate device via said switch.

9. The system of claim 8, wherein said intermediate device is a small-form factor pluggable (SFP) transceiver.

10. The system of claim 9, wherein said SFP has one port connected in the first device and the other port connected to the network.

11. The system of claim 9, wherein the SFP transceiver is an optical transceiver.

12. The system of claim 8, wherein said first device and said second device are connected to said intermediate device via an interface selected from an optical interface, a copper interface, and a combination thereof.

13. The system of claim 8, wherein the Ethernet settings are selected from the group consisting of speed, half or full duplex, master clock, slave clock, and other parameters.

14. The system of claim 8, wherein the intermediate device comprises a field-programmable gate array (FPGA), central processing unit (CPU), or combination thereof.

15. The system of claim 8, wherein said modifying said auto-negotiation function comprises replacing the auto-negotiation function with a function that acts as a programmable switch for an interface provided by a physical medium attachment (PMA) layer.

16. The system of claim 15, wherein the interface provided by the PMA layer is an 8-bit interface.

\* \* \* \* \*